US010536056B2

(12) United States Patent
Koizumi (10) Patent No.: US 10,536,056 B2
(45) Date of Patent: Jan. 14, 2020

(54) ELECTRIC POWER TOOL

(71) Applicant: Hitachi Koki Co., Ltd., Tokyo (JP)

(72) Inventor: Toshiaki Koizumi, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 465 days.

(21) Appl. No.: 14/438,378

(22) PCT Filed: Oct. 25, 2013

(86) PCT No.: PCT/JP2013/078988
§ 371 (c)(1),
(2) Date: Apr. 24, 2015

(87) PCT Pub. No.: WO2014/069369
PCT Pub. Date: May 8, 2014

(65) Prior Publication Data
US 2015/0288259 A1 Oct. 8, 2015

(30) Foreign Application Priority Data

Oct. 29, 2012 (JP) ................................ 2012-237586

(51) Int. Cl.
*H02K 11/02* (2016.01)
*H02K 11/05* (2016.01)
(Continued)

(52) U.S. Cl.
CPC ............... *H02K 11/02* (2013.01); *B25F 5/02* (2013.01); *H02K 7/145* (2013.01); *H02K 11/05* (2016.01)

(58) Field of Classification Search
CPC ...... H02K 11/02; H02K 11/05; H02K 11/024; H02K 7/145; B25F 5/00; B25F 5/006; B25F 5/02
(Continued)

(56) References Cited

U.S. PATENT DOCUMENTS 8,928,261 B2   1/2015  Haga et al.
2003/0127932 A1*  7/2003  Ishida ................... H02K 23/36
                                                    310/184
(Continued)

FOREIGN PATENT DOCUMENTS

CN   101181787 A   5/2008
CN   102335895 A   2/2012
(Continued)

OTHER PUBLICATIONS

International Report on Patentability for application PCT/JP2013/078988 (dated May 14, 2015), 6 pages.
(Continued)

*Primary Examiner* — Alexander M Valvis
*Assistant Examiner* — Mary C Hibbert-Colpeland
(74) *Attorney, Agent, or Firm* — Kilpatrick Townsend & Stockton LLP (57) ABSTRACT

An electric power tool 1 has a motor 3, a housing 2, a power cord 9, and a power supply control circuit portion 8. The housing 2 has a body portion 21 for accommodating the motor, a substrate accommodating portion 23 for accommodating a substrate on which a control substrate for operating the motor 3 is mounted, a handle portion 22 having one end connected to the body portion 21 and another end connected to the substrate accommodating portion 23. The power cord 9 extends from the substrate accommodating portion 23 and is connected to an AC power supply. The power supply circuit portion 8 has a choke coil 86 and a film capacitor 88 for filtering noise, and converts AC power supplied through the power cord 9 to DC power. The choke coil 86 and a film capacitor 88 are accommodated in the substrate accommodating portion 23. Accordingly, the handle portion can be formed shorter, and assemblability of the electric power tool can be improved.

15 Claims, 4 Drawing Sheets

(51) Int. Cl.
  *B25F 5/02* (2006.01)
  *H02K 7/14* (2006.01)
(58) Field of Classification Search
  USPC .......... 173/213, 2, 48, 171, 90; 310/50, 184, 310/71, 239
  See application file for complete search history.

(56) References Cited

U.S. PATENT DOCUMENTS

| | | | |
|---|---|---|---|
| 2005/0155778 A1* | 7/2005 | Ishida | B25F 5/006 173/217 |
| 2008/0135268 A1 | 6/2008 | Tadokoro et al. | |
| 2009/0229957 A1* | 9/2009 | Nishimiya | B25F 5/008 200/292 |
| 2010/0314147 A1* | 12/2010 | Muller | B25F 5/006 173/171 |
| 2011/0018380 A1* | 1/2011 | Yoshida | H02K 5/148 310/154.21 |
| 2013/0000934 A1 | 1/2013 | Tadokoro et al. | |
| 2015/0015094 A1 | 1/2015 | Haga et al. | |

FOREIGN PATENT DOCUMENTS

| | | |
|---|---|---|
| EP | 2434634 A2 | 3/2012 |
| EP | 2489478 A2 | 8/2012 |
| JP | 2001-245462 A | 9/2001 |
| JP | 2010-149251 A | 7/2010 |
| JP | 2012-139747 A | 7/2012 |
| JP | 2012-139749 A | 7/2012 |
| JP | 2012-139786 A | 7/2012 |

OTHER PUBLICATIONS

Extended European Seach Report for application EP13850862.7 (dated Jun. 6, 2016).
International Search Report for application PCT/JP2013/078988 (dated Dec. 17, 2013).
China Intellectual Property Office office action for patent application CN201380056319.X (dated Dec. 25, 2015).
Extended European Search Report for application EP13850862.7 (dated Jun. 6, 2016).

* cited by examiner

ELECTRIC POWER TOOL

FIELD OF THE INVENTION

The present invention relates to an electric power tool and, more particularly, to an electric power tool having a motor driven by a commercial AC power supply as a power supply.

BACKGROUND ART

An electric power tool, such as an impact driver, driven by electric power supplied from an AC power supply to a motor thereof is well-known (for example, see Patent document 1). The impact driver has a film capacitor and a ferrite core for filtering electromagnetic noise and a power circuit portion for converting AC power from an AC power supply into DC power. The film capacitor and the ferrite core are housed in a handle portion of the impact driver.

PRIOR ART DOCUMENTS

Patent Document

Patent Document 1: Japanese Patent Application Publication 2012-139747

SUMMARY OF INVENTION

Problems to be Solved by Invention

However, in a configuration of the conventional impact driver, the film capacitor and the ferrite core are housed in the handle portion, so that the handle portion is inevitably formed thicker and longer than necessary. Further, the film capacitor and the ferrite core need to be arranged so as not to interfere with signal lines passing through the handle portion, degrading assemblability of the impact driver.

An object of the present invention is to provide an electric power tool having a thinner and shorter handle portion and improved assemblability.

Means for Solving Problems

In order to achieve the above object, the present invention provides an electric power tool having: a motor; a housing having a body portion for accommodating the motor, a substrate accommodating portion for accommodating a substrate on which a control circuit for operating the motor is mounted, and a handle portion having one end connected to the body portion and an other end connected to the substrate accommodating portion; a power cord extending from the substrate accommodating portion and being connectable with an alternating power supply; and a power supply circuit portion having a noise filtering element for filtering noise, the power supply circuit portion being configured to convert alternating power supplied through the power cord to direct current power. The noise filtering element is accommodated in the substrate accommodating portion.

With this configuration, interference between signal lines passing in the handle portion can be prevented, and disconnection of the signal lines can be prevented. This structure further facilitates routing of the signal lines in the handle portion, thereby improving assemblability of the electric power tool. Further, because the noise filtering element is disposed outside of the handle portion, a grip portion of the handle portion can be formed thinner and shorter.

Further, preferably, an end bit tool holding portion is provided in the body portion for holding an end bit. The motor and the end bit tool holding portion are provided along one direction in this order in the body portion. The noise filtering element is positioned at one end in the one direction in the substrate accommodating portion.

With this configuration, the total length of the body portion, the handle portion, and the substrate accommodating portion arranged in this order in the electric power tool can be shortened, thereby making the entire size of the electric power tool compact. Further, the substrate accommodating portion for accommodating the noise filtering element can be prevented from impeding operation of the electric power tool during the working state.

Preferably, an end bit tool holding portion is provided in the body portion for holding an end bit. The motor and the end bit tool holding portion are provided in this order along one direction in the body portion. The substrate accommodating portion protrudes in the one direction. The substrate accommodating portion has one end in the one direction positioned closer to the motor than the end bit tool holding portion is.

With this configuration, the protruding portion of the substrate accommodating portion does not abut against a workpiece during the working state, thereby preventing the substrate accommodating portion from impeding the operation of the electric power tool.

Preferably, an end bit tool holding portion is provided in the body portion for holding an end bit. The motor and the end bit tool holding portion are provided along one direction in this order in the body portion. The noise filtering element is positioned at another end which is opposite to the one end in the one direction in the substrate accommodating portion.

With this configuration, a total length of the electric power tool in a direction in which the body portion, the handle portion, and the substrate accommodating portion are arranged can be shortened, thereby making the entire body of the electric power tool compact.

Preferably, the noise filtering element is positioned at a substantially same position as that of the substrate or on an opposite side to the handle portion with respect to the substrate in an arranging order of the body portion, the handle portion, and the substrate accommodating portion.

With this configuration, interference between signal lines passing in the handle portion can be prevented, and disconnection of the signal lines can be prevented. This structure further facilitates routing of the signal lines in the handle portion, thereby improving assemblability of the electric power tool. Further, because the noise removing element is disposed outside of the handle portion, a grip portion of the handle portion can be formed thinner and shorter.

Preferably, a pressing member is provided in the substrate accommodating portion for suppressing vibration of the noise filtering element.

With this configuration, because the pressing member is disposed around the noise filtering element, vibration of the noise filtering element during the operation of the electric power tool can be prevented.

Preferably, the noise filtering element comprises a choke coil and a capacitor.

The present invention further provides an electric power tool having: a motor having a rotation axis extending in a front-back direction; a housing comprising a body portion for accommodating the motor, a handle portion extending from the body portion, and a projecting portion provided at an opposite end to the body portion of the handle portion and projecting frontward and/or rearward; a power cord extending from the projecting portion and connectable with an alternating power supply; and a noise filtering element for filtering noise. The noise filtering element is accommodated in the projecting portion.

With this configuration, because the noise filtering element is provided in the protruding portion, the handle portion can be formed thinner and shorter.

Preferably, the projecting portion accommodates a power supply circuit portion for converting alternating power supplied through the power cord to direct current power, and a substrate on which a control circuit for operating the motor is mounted.

Advantages of Invention

According to the present invention, the handle portion can be formed thinner and shorter, thereby improving assemblability of the electric power tool.

DESCRIPTION OF EMBODIMENTS

Hereinafter, an impact driver 1 according to a first embodiment of the present invention will be described as an embodiment of an electric power tool according to the present invention referring to FIGS. 1 and 2.

Figure 1:
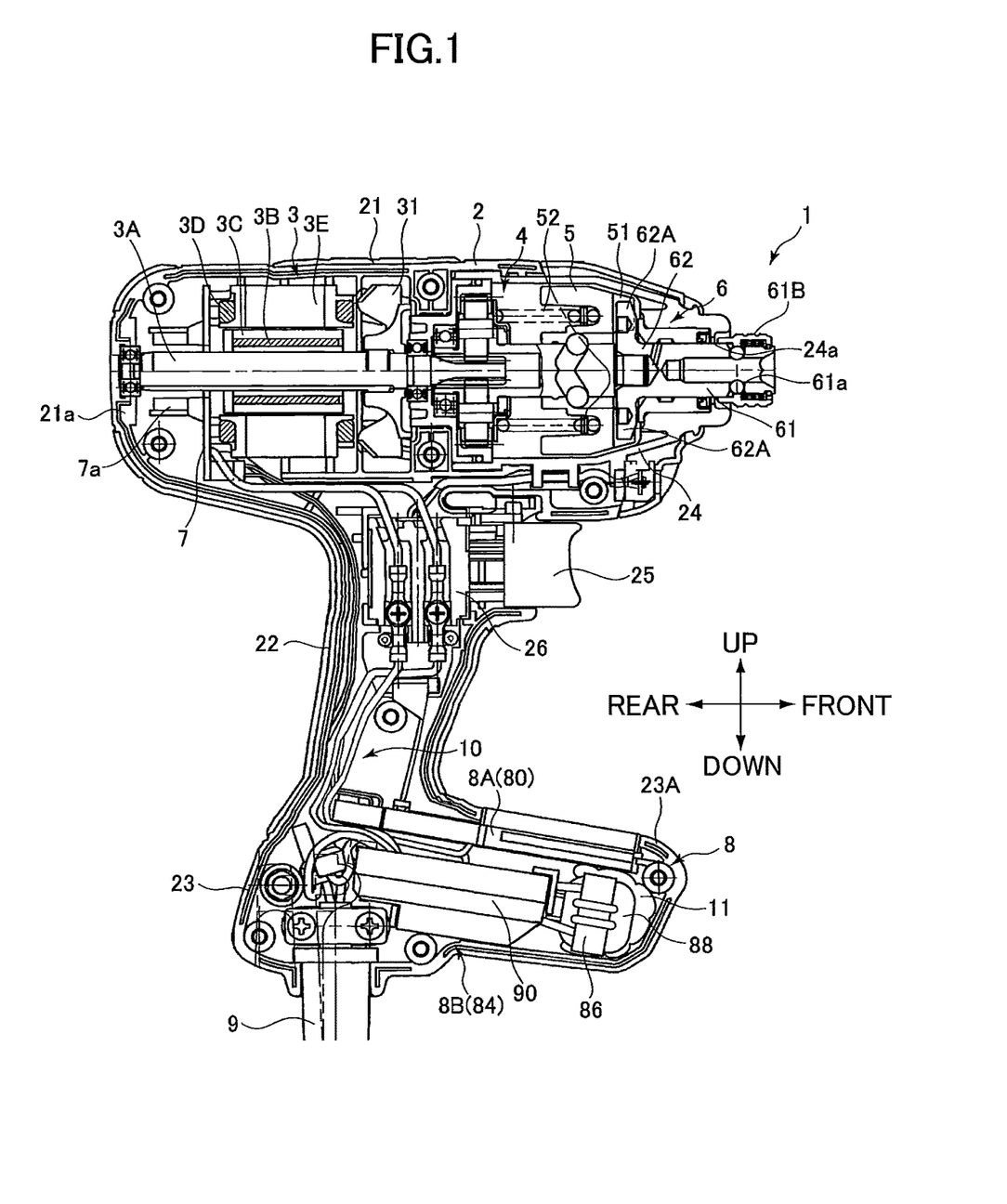
FIG. 1 A cross section showing an impact driver of the first embodiment according to the present invention.
Figure 2:
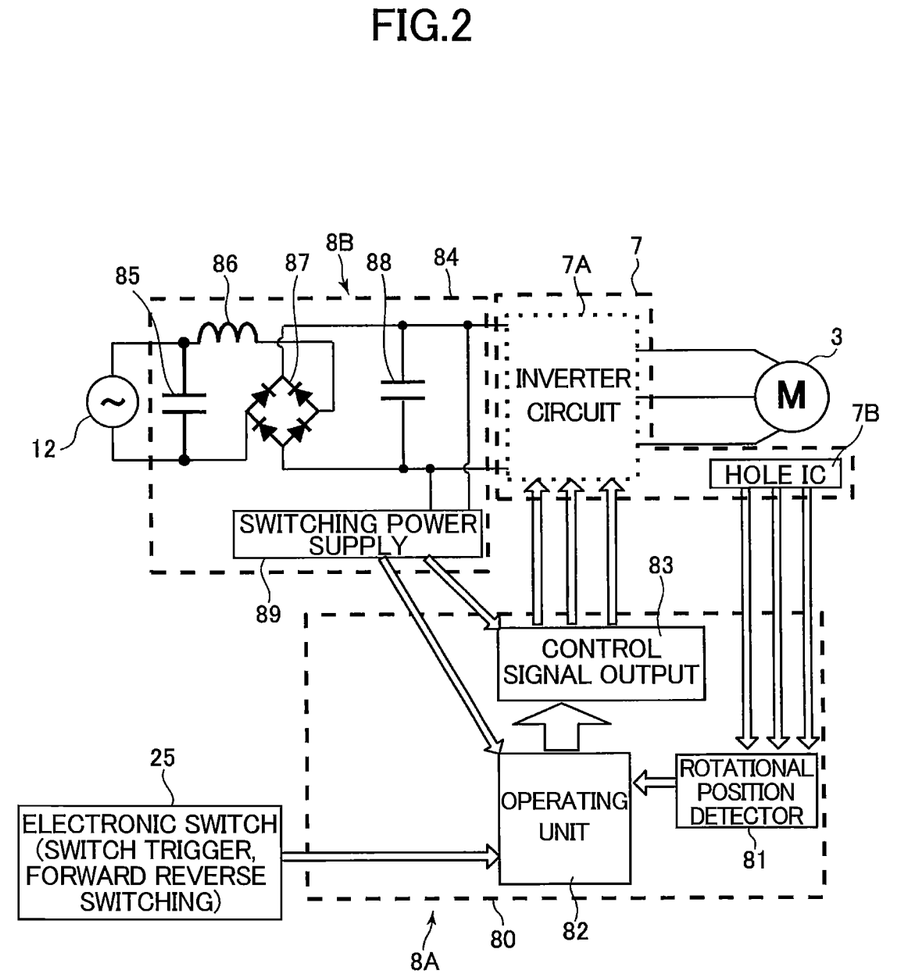
FIG. 2 A control block diagram of the impact driver of the first embodiment according to the present invention.

As illustrated in FIG. 1, the impact driver 1 mainly includes a housing 2, a motor 3, a gear mechanism 4, a hammer 5, an anvil portion 6, an inverter circuit portion 7, a control portion 8, and a power cord 9.

The housing 2 is made from resin and constitutes a shell of the impact driver 1. The housing 2 mainly includes a substantially tubular shaped body portion 21, a handle portion 22 extending from the body portion 21, and a substrate accommodating portion 23. The body portion 21 has a substantially tubular shape and accommodates the motor 3, the gear mechanism 4, the hammer 5, the anvil portion 6 in this order. In the following description, the side at which the anvil portion 6 is provided is defined as a front side, and the side at which the motor 3 is provided is defined as a rear side. Further, the side to which the handle portion 22 extends from the body portion 21 is defined as a lower side, and its opposite side is defined as an upper side. Further, the front side of a paper surface of FIG. 1 is defined as a right side, and its opposite side is defined as a left side.

A metal hammer casing 24 accommodating the hammer 5 and the anvil portion 6 therein is disposed in front of body portion 21. The hammer casing 24 has a substantially funnel shape whose diameter is gradually reduced to the front, and has an opening 24a at a front end portion thereof. A plurality of inlet ports 21a through which external air is introduced is formed in a rear end surface of the body portion 21. A plurality of outlet ports (not illustrated) through which the introduced external air is exhausted is formed in a side surface of the body portion 21 that surrounds a cooling fan 31 described later.

The handle portion 22 has a substantially tubular shape. An upper end of the handle portion 22 is connected to the body portion 21. And, a lower end of the handle portion 22 is connected to the substrate accommodating portion 23. The handle portion 22 has a trigger 25 as an electronic switch. The trigger 25 is connected to a switch mechanism 26 housed in the handle portion 22. The trigger 25 allows switching between supply and interruption of power to the motor 3. A forward/reverse changeover switch (not-illustrated) which is an electronic switch for switching a rotation direction of the motor is provided at a connection portion between the handle portion 22 and the body portion 21 and just above the trigger 25.

The control portion 8 is housed in the substrate accommodating portion 23, and the power cord 9 extends downward from the substrate accommodating portion 23. The substrate accommodating portion 23 has a protruding portion 23A protruding frontward from the motor 3 to the anvil portion 6. A front end portion of the protruding portion 23A does not protrude frontward from an end bit tool holding portion 61. That is, the front end portion of the protruding portion 23A is positioned closer to the motor 3 than the end bit tool holding portion 61 is. A width of the substrate accommodating portion 23 in the left-right direction is substantially equal to a width of the body portion 21 in the left-right direction.

The motor 3 is a brushless motor and has an output shaft 3A extending in the front-back direction, a rotor 3C fixed to the output shaft 3A and having a plurality of permanent magnets 3B, and a stator 3E disposed so as to surround the rotor 3C and having a plurality of coils 3D. The cooling fan 31 is fixed to a front end portion of the output shaft 3A.

The gear mechanism 4 is disposed frontward of the motor 3. The gear mechanism 4 has a deceleration mechanism constituted by a planetary gear mechanism including a plurality of gears and transmits rotation of the output shaft 3A to the hammer 5 after decelerating the rotation.

The hammer 5 has a pair of hitting portions 51 at a front end thereof. The hammer 5 is biased frontward by a spring 52 and configured to be movable rearward against the biasing force of the spring.

The anvil portion 6 is disposed frontward of the hammer 5 and mainly includes the end bit tool holding portion 61, and an anvil 62. The end bit tool holding portion 61 is formed into a cylindrical shape and rotatably supported by the hammer casing 24. The end bit tool holding portion 61 has a hole 61a drilled extending in the front-back direction through which a bit (not illustrated) is inserted, and a chuck 61B for holding the bit (not illustrated) is provided at the front end portion of the end bit tool holding portion 61.

The anvil 62 is positioned rearward of the end bit tool holding portion 61 and is formed integrally with the end bit tool holding portion 61 in the hammer casing 24. The anvil 62 has a pair of hit parts 62A disposed at opposed positions with respect to a rotation center of the end bit tool holding portion 61. When the hammer 5 is rotated, one hitting portion 51 hits one hit portion 62A, and the other hitting portion 51 hits the other hit portion 62A, causing torque of the hammer to be transmitted to the anvil 62. As a result, the anvil 62 is hit. After hitting of the hitting portions 51 against the hit parts 62A, the hammer 5 is moved rearward against the biasing force of the spring 52 while being rotated. Then, when the hitting portions 51 override the hit parts 62A, elastic energy stored in the spring 52 is released to move the hammer 5 frontward. As a result, the hitting portions 51 are caused to again hit the hit parts 62A.

The inverter circuit portion 7 includes an inverter circuit 7A including switching elements 7a such as a MOSFET (Metal Oxide Semiconductor Field Effect Transistor) or an IGBT (Insulated Gate Bipolar Transistor), and a hall element 7B (FIG. 2) that detects magnetic force of the permanent magnet 3B of the rotor 3C or a sensor magnet (not illustrated) for detection of a rotation position of the rotor 3C. The control portion 8 is housed in the substrate accommodating portion 23. The control portion 8 controls an amount of power to be supplied to the motor in accordance with an operation amount of the trigger 25 to control a rotation speed of the motor 3. A detailed configuration of the control portion 8 will be described later. The power cord 9 is connected to an AC power supply (not illustrated) so as to supply power to the control portion 8.

The control portion 8 includes a control circuit portion 8A and a power supply circuit portion 8B. The control circuit portion 8A is disposed inside the substrate accommodating portion 23 at a position closest to the handle portion 22. As illustrated in FIG. 2, the control circuit portion 8A has a control circuit substrate 80 on which a rotation position detection circuit 81, an operating unit 82, and a control signal output circuit 83 are mounted.

The rotation position detection circuit 81 detects a rotation position of the rotor 3C based on a signal from the hall element 7B and outputs the rotation position to the operating unit 82. The operating unit 82 includes a CPU (Central Processing Unit) for outputting a drive signal based on a processing program and data, a ROM for storing the processing program and/or control data, a RAM for temporarily storing data, and a timer. The operating unit 82 generates a PWM signal based on a signal from the rotation position detection circuit 81 and outputs the generated PWM signal to the control signal output circuit 83. The control signal output circuit 83 outputs the PWM signal to the inverter circuit 7A.

The operating unit 82 is connected to the trigger 25 and a normal/reverse changeover switch (not illustrated) as an electronic switch. Thus, the operating unit 82 controls a rotation speed of the motor 3 in accordance with an operation amount of the trigger 25 and switches a rotation direction of the motor 3 in response to switching of the normal/reverse changeover switch.

As illustrated in FIG. 1, the power supply circuit portion 8B is disposed between the power cord 9 and the control circuit portion 8A, that is, below the control circuit portion 8A in the substrate accommodating portion 23. As illustrated in FIG. 2, the power supply circuit portion 8B has a power supply circuit substrate 84. A capacitor 85, a choke coil 86, a diode bridge 87, a film capacitor 88, and a switching power supply circuit 89 are mounted on the power supply circuit substrate 84.

The capacitor 85 and the choke coil 86 filter (reduce) noise generated by the inverter circuit 7A. The diode bridge 87 full-wave rectifies the AC power supplied from the power cord 9. The film capacitor 88 smoothes the full-wave rectified current.

An AC 100 V power supplied from the power cord 9 connected to the AC power supply 12 is rectified by the diode bridge 87. Afterward, a part of the rectified AC power is converted to 18 V by the switching power supply circuit 89 and then supplied to the control circuit portion 8A as a drive power. The remaining power is boosted to 140 V as a drive power for the motor 3 and then supplied to the inverter circuit 7A. The power supply circuit portion 8B is covered by a vessel 90, and the vessel 90 is filled with urethane. That is, fixation, isolation, vibration-proof, and water-proof of elements of the power supply circuit portion 8B are achieved by the urethane.

The capacitor 85, the diode bridge 87, and the switching power supply circuit 89 are disposed on a substrate in the vessel 90. As illustrated in FIG. 1, the choke coil 86 and the film capacitor 88 are disposed outside the vessel 90 and near a front end portion of the protruding portion 23A disposed frontward of the vessel 90. The choke coil 86 and the film capacitor 88 are disposed on an opposite side to the handle portion 22 with respect to the control circuit portion 8A (control circuit substrate 80) in the up-down direction. In the substrate accommodating portion 23, a pressing member 11 formed from rubber or urethane is disposed around the choke coil 86 and the film capacitor 88, thereby suppressing vibration of the choke coil 86 and the film capacitor 88 during operation of the impact driver 1. That is, in the substrate accommodating portion 23 (protruding portion 23A), the control circuit portion 8A is disposed in the upper portion, and the power supply circuit portion 8B, the choke coil 86, and the film capacitor 88 are disposed below the control circuit portion 8A. And the choke coil 86 and the film capacitor 88 are disposed frontward of the power supply circuit portion 8B.

A plurality of signal lines 10 extend from each of the control circuit portion 8A and the power supply circuit portion 8B and pass through the handle portion 22 to be electrically connected to the switch mechanism 26 and the inverter circuit portion 7.

The operation of the impact driver 1 will be described. The power cord 9 is connected to a power supply (not illustrated), and then an operator pulls the trigger 25 in this state. Then, the motor 3 is rotated at the rotation speed corresponding to a pulling amount of the trigger 25. At the same time, the cooling fan 31 is rotated to draw air through the inlet ports 21a. The external air cools the inverter circuit portion 7 and the motor 3 and is thereafter exhausted outside through the outlet ports (not illustrated). A rotation of the motor 3 causes the hammer 5 to hit the anvil portion 6, thereby causing a tip end tool (not illustrated) to be rotated. When the operator releases the trigger 25, the motor 3 is stopped.

As described above, the choke coil 86 and the film capacitor 88 are housed in the substrate accommodating portion 23, so that the choke coil 86 and the film capacitor 88 can be prevented from interfering with the signal lines 10 passing inside the handle portion 22, which in turn can prevent disconnection of the signal lines 10. This structure further facilitates routing of the signal lines 10. That is, the signal lines 10 can be routed in a location where a conventional noise removing member was disposed, thus improving assemblability of the impact driver 1. Further, because the choke coil 86 and the film capacitor 88 are not disposed in the handle portion 22, a grip portion of the handle portion 22 can be formed thinner and shorter.

Further, the choke coil 86 and the film capacitor 88 are disposed at the front end portion of the protruding portion 23A in the substrate accommodating portion 23, so that a length of the impact driver 1 in the up-down direction can be shortened, thereby making the entire body of the impact driver 1 compact. Further, the substrate accommodating portion 23 that houses the choke coil 86 and the film capacitor 88 can be prevented from impeding operation during work. Furthermore, the choke coil 86 and the film capacitor 88 are disposed near (adjacent to) the power supply circuit portion 8B to which the choke coil 86 and the film capacitor 88 are connected, so that the wiring connection of the choke coil 86 and the film capacitor 88 can be shortened, thereby facilitating routing of the wiring and preventing disconnection. Furthermore, since the choke coil 86 and the film capacitor 88 are disposed at substantially the same position as the power supply circuit portion 8B in the up-down direction, a dimension of the substrate accommodating portion 23 in the up-down direction can be reduced.

Further, the front end portion of the protruding portion 23A is positioned closer to the motor 3 than the end bit tool holding portion 61 is. This structure prevents the protruding portion 23A from abutting against a workpiece, thus preventing the protruding portion 23A from impeding the operation of the power tool during the working state.

Further, the choke coil 86 and the film capacitor 88 are disposed at the opposite side to the handle portion 22 with respect to the control circuit portion 8A (control circuit substrate 80) in the up-down direction, so that the choke coil 86 and the film capacitor 88 can be prevented from interfering with the signal lines 10 passing inside the handle portion 22 and preventing disconnection of the signal lines 10. This structure further facilitates routing of the signal lines 10 in the handle portion 22, thus improving assemblability of the impact driver 1. Further, because the choke coil 86 and the film capacitor 88 are not disposed in the handle portion 22, a grip portion of the handle portion 22 can be formed so as to have a proper thickness and dimensions.

Further, in the substrate accommodating portion 23, the pressing member 11 is disposed around the choke coil 86 and the film capacitor 88, thereby suppressing vibration of the choke coil 86 and the film capacitor 88 during the operation of the impact driver 1.

The following description will be made for explaining a configuration of an impact driver 101 according to a second embodiment of the present invention based on FIG. 3. The same reference numerals are given to the same elements as those of the first embodiment, so a description thereof will be omitted and only different elements will be explained.

Figure 3:
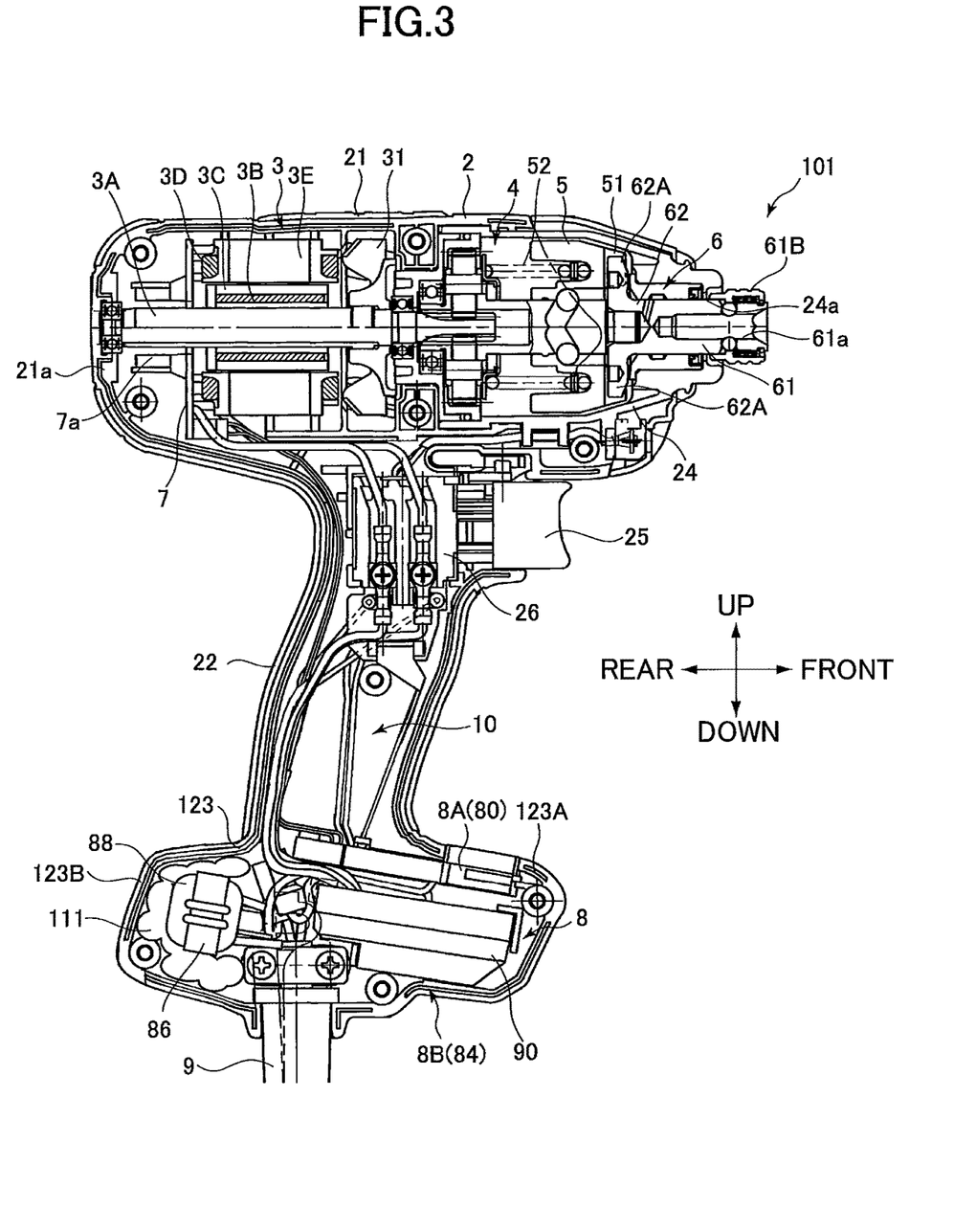
FIG. 3 A cross section showing an impact driver of the second embodiment according to the present invention.

As illustrated in FIG. 3, a substrate accommodating portion 123 has a first protruding portion 123A protruding frontward and a second protruding portion 123B protruding rearward. The first protruding portion 123A houses front end portions of the control circuit portion 8A and the power supply circuit portion 8B. And the second protruding portion 123B houses the choke coil 86 and the film capacitor 88. Further, in the second protruding portion 123B, a pressing member 111 formed of rubber or urethane is disposed around the choke coil 86 and the film capacitor 88.

The impact driver 101 according to the present embodiment can provide the same effects as those of the impact driver 1 according to the first embodiment. Further, a rear end portion of the second protruding portion 123B does not protrude rearward from a rear end portion of the body portion 21, thus preventing the second protruding portion 123B from impeding operation during work.

The following description will be made for explaining a configuration of an impact driver 201 according to a third embodiment of the present invention based on FIG. 4. The same reference numerals are given to the same elements as those in the first embodiment, so that the description thereof will be omitted and only different elements will be explained.

Figure 4:
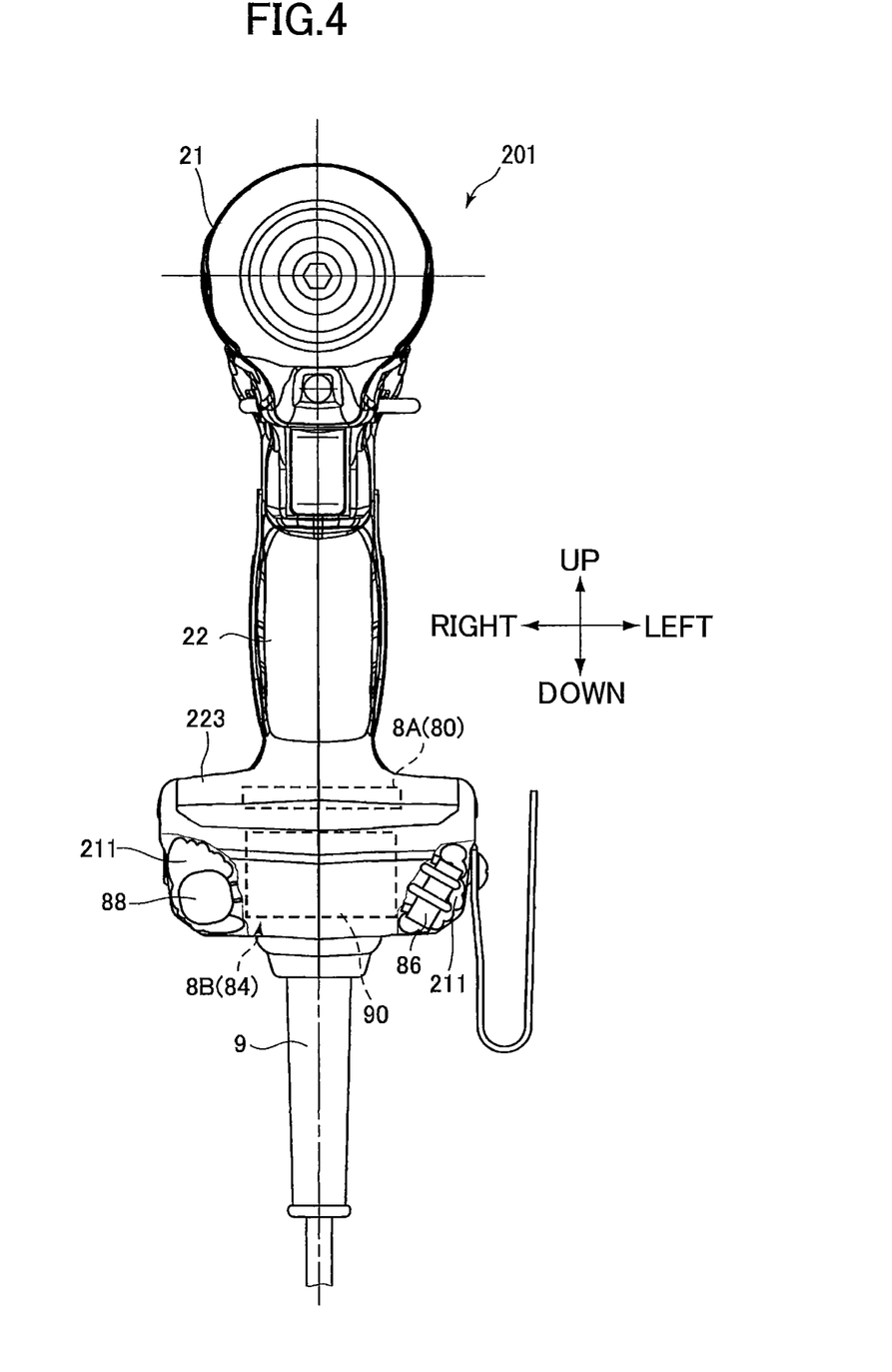
FIG. 4 A cross section showing an impact driver of the third embodiment according to the present invention.

As illustrated in FIG. 4, a width of a substrate accommodating portion 223 in the left-right direction is larger than a width of the body portion 21 in the left-right direction. The choke coil 86 and the film capacitor 88 are disposed at both sides of the vessel 90 of the power supply circuit portion 8B in a left-right direction, respectively. That is, the choke coil 86 and the film capacitor 88 are disposed on an opposite side to the handle portion 22 with respect to the control circuit portion 8A (control circuit substrate 80) in the up-down direction. In the substrate accommodating portion 223, pressing members 211, each of which is formed from rubber or urethane, are disposed around the choke coil 86 and the film capacitor 88, respectively.

The impact driver 201 according to the present embodiment can provide the same advantages as those of the impact driver 1 according to the first embodiment.

The electric power tool of the present invention is not limited to the above embodiments, but various modification and changes may be made within the scope of the appended claims. For example, in the above embodiments, the impact driver 1 has been explained as the electric power tool; however, the electric power tool according to the present invention is not limited to the impact driver 1 but may be any electric power tool as long as the impact driver 1 has a brushless motor and is driven by an AC power supply. Further, in the above embodiments, vibration of the choke coil 86 and the film capacitor 88 is suppressed by the pressing member. Alternatively, a rib that supports the choke coil 86 and the film capacitor 88 may be formed in an inner peripheral surface of the substrate accommodating portion 23 so as to suppress the vibration of the choke coil 86 and the film capacitor 88.

Further, in the above embodiments, the choke coil 86 and the film capacitor 88 are disposed on an opposite side to the handle portion 22 with respect to the control circuit portion 8A (control circuit substrate 80) in the up-down direction. Alternatively, the choke coil 86 and the film capacitor 88 may be disposed at substantially the same positions as that of the control circuit portion 8A (control circuit substrate 80) in the up-down direction. In other words, the choke coil 86 and the film capacitor 88 may be disposed in any position other than the area above the control circuit portion 8A (control circuit substrate 80). This is because when the choke coil 86 and the film capacitor 88 are disposed above the control circuit portion 8A, the choke coil 86 and the film capacitor 88 may interfere with the signal lines extending from the control circuit portion 8A, thereby deteriorating assemblability and causing disconnection. The choke coil 86 and the film capacitor 88 may be disposed below the power supply circuit portion 8B.

EXPLANATION OF REFERENCE NUMERALS

1 . . . impact driver, 2 . . . housing, 3 . . . motor, 9 . . . power cord, 11, 111, 211 . . . pressing member, 8B . . . power circuit portion, 21 . . . body portion, 22 . . . handle portion, 23 . . . substrate accommodating portion, 61 . . . end bit holding portion, 86 . . . choke coil, and 88 . . . film capacitor

The invention claimed is:

1. An electric power tool comprising:
   a brushless motor;
   a housing comprising a body portion for accommodating the motor, the body portion extending in a front-rear direction, a substrate accommodating portion for accommodating a substrate, and a handle portion having one end connected to the body portion and another end connected to the substrate accommodating portion, the handle portion extending downward from the body portion, the substrate accommodating portion protruding outside of the handle portion in a radial direction of the handle portion;
   a power cord extending from the substrate accommodating portion along an extension line extending in a longitudinal direction of the handle portion, the power cord being connectable with an alternating power supply;

a power supply circuit portion configured to convert alternating power supplied through the power cord to direct current power, the power supply circuit portion including a power supply circuit substrate; and a noise filtering element for filtering noise, wherein the body portion, the substrate accommodating portion, and the handle portion are integrally formed from resin, and wherein the power supply circuit portion and the noise filtering element are accommodated in the housing, the noise filtering element is separated from the power supply circuit substrate, and the noise filtering element is connected to the power supply circuit portion by wiring to be accommodated in the substrate accommodating portion which is integrally formed with the handle portion.

2. An electric power tool according to claim 1, further comprising an end bit tool holding portion provided in the body portion for holding an end bit, wherein the motor and the end bit tool holding portion are provided along one direction in this order in the body portion, the noise filtering element is positioned at one end in the one direction in the substrate accommodating portion.

3. An electric power tool according to claim 1, further comprising an end bit tool holding portion provided in the body portion for holding an end bit, wherein the motor and the end bit tool holding portion are provided in this order along one direction in the body portion, the substrate accommodating portion protrudes in the one direction, and the substrate accommodating portion has one end in the one direction positioned closer to the motor than the end bit tool holding portion is.

4. An electric power tool according to claim 1, further comprising an end bit tool holding portion provided in the body portion for holding an end bit, wherein the motor and the end bit tool holding portion are provided along one direction in this order in the body portion, the noise filtering element is positioned at another end which is opposite to the one end in the one direction in the substrate accommodating portion.

5. An electric power tool according to claim 1, further comprising a substrate accommodated in the substrate accommodating portion, wherein the noise filtering element is positioned at a substantially same position as that of the substrate or on an opposite side to the handle portion with respect to the substrate in an arranging order of the body portion, the handle portion, and the substrate accommodating portion.

6. An electric power tool according to claim 1, further comprising a pressing member provided in the substrate accommodating portion for suppressing vibration of the noise filtering element.

7. An electric power tool according to claim 1, wherein the noise filtering element comprises a choke coil and a capacitor.

8. An electric power tool comprising:

a brushless motor having a rotation axis extending in a front-back direction;

a housing comprising a body portion for accommodating the motor, the body portion extending in a front-rear direction, a handle portion extending downward from the body portion, and a projecting portion provided at an opposite end to the body portion of the handle portion, the projecting portion projecting in the front-back direction with respect to the handle portion, the body portion, the handle portion, and the projecting portion being integrally formed from resin;

a power cord extending from the projecting portion along an extension line extending in a longitudinal direction of the handle portion, the power cord being connectable with an alternating power supply, the power supply circuit portion including a power supply circuit substrate;

a power supply circuit portion configured to convert alternating power supplied through the power cord to direct current power, and a noise filtering element for filtering noise, wherein the noise filtering element is separated from the, power supply circuit substrate, the noise filtering element is connected to the power supply circuit portion by wiring to be accommodated in the projecting portion which is integrally formed with the handle portion.

9. An electric power tool according to claim 8, further comprising a control circuit provided on the power supply circuit substrate for operating the motor, wherein the projecting portion accommodates the power supply circuit portion, and the power supply circuit substrate.

10. An electric power tool according to claim 1, further comprising an inverter circuit portion accommodated in the housing, and a control circuit portion configured to generate a PWM signal and output the generated PWM signal to the inverter circuit.

11. An electric power tool according to claim 8, further comprising an inverter circuit portion accommodated in the and a control circuit portion configured to generate a PWM signal and output the generated PWM signal to the inverter circuit.

12. An electric power tool according to claim 1, wherein the power supply circuit portion is covered by a vessel, and wherein the noise filtering element is disposed outside the vessel.

13. An electric power tool according to claim 8, wherein the power supply circuit portion is covered by a vessel, and wherein the noise filtering element is disposed outside the vessel.

14. An electric power tool according to claim 1, further comprising a trigger as an electronic switch, the trigger allows switching between supply and interruption of power to the brushless motor, wherein the trigger is disposed outside a current path between the alternating power supply and the brushless motor.

15. An electric power tool according to claim 8, further comprising a trigger as an electronic switch, the trigger allows switching between supply and interruption of power to the brushless motor, wherein the trigger is disposed outside a current path between the alternating power supply and the brushless motor.

* * * * *